United States Patent
Govindjee et al.

(10) Patent No.: US 12,321,685 B2
(45) Date of Patent: Jun. 3, 2025

(54) NATURAL LANGUAGE PROCESSING ELECTRONIC PASSAGE CURATION

(71) Applicant: INTERNATIONAL BUSINESS MACHINES CORPORATION, Armonk, NY (US)

(72) Inventors: Anita Govindjee, Ithaca, NY (US); Morgan Carroll, Austin, TX (US); Pratyush Singh, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/192,066

(22) Filed: Mar. 29, 2023

(65) Prior Publication Data

US 2024/0330567 A1 Oct. 3, 2024

(51) Int. Cl.
*G06F 40/117* (2020.01)
*G06F 3/01* (2006.01)
*G06F 40/169* (2020.01)
*G06F 40/30* (2020.01)

(52) U.S. Cl.
CPC ............ *G06F 40/117* (2020.01); *G06F 3/013* (2013.01); *G06F 40/169* (2020.01); *G06F 40/30* (2020.01)

(58) Field of Classification Search
CPC ...... G06F 40/117; G06F 3/013; G06F 40/169; G06F 40/30
See application file for complete search history.

(56) References Cited

U.S. PATENT DOCUMENTS

| | | | |
|---|---|---|---|
| 8,650,476 B1 * | 2/2014 | Belle | G06F 40/169 |
| | | | 705/26.35 |
| 9,037,537 B2 | 5/2015 | Deroller | |
| 9,213,687 B2 | 12/2015 | Au | |
| 9,430,776 B2 | 8/2016 | Puppin | |

(Continued)

FOREIGN PATENT DOCUMENTS

| | | |
|---|---|---|
| CA | 3080614 A1 | 5/2019 |
| CN | 108108468 A | 6/2018 |

(Continued)

OTHER PUBLICATIONS

Disclosed Anonymously, "UI Parsing of Repetitive Information to Surface and Highlight Unique Data from Various Sources," IP.com, Nov. 2, 2022, 6 pages, IP.com No. IPCOM000271183D, Retrieved from the Internet: <URL: https://priorart.ip.com/IPCOM/000271183>.

(Continued)

*Primary Examiner* — Hope C Sheffield
(74) *Attorney, Agent, or Firm* — Robert D. Bean (57) ABSTRACT

According to one embodiment, a method, computer system, and computer program product for electronic text curation is provided. The present invention may include analyzing text of an electronic book and reader preferences; coordinating at least one preset value based on the analyzed text and the analyzed reader preferences; calculating one or more initial scores; annotating the text of the electronic book based on the analyzed text and the analyzed reader preferences; updating the one or more calculated initial scores through dynamic scoring implementation; calculating one or more final scores; and highlighting the text of the electronic book based on the one or more calculated final scores.

18 Claims, 4 Drawing Sheets

(56) References Cited

U.S. PATENT DOCUMENTS

| | | |
|---|---|---|
| 9,762,963 B2 | 9/2017 | Jarman |
| 10,460,177 B2 | 10/2019 | Chan |
| 10,474,709 B2 | 11/2019 | Paulus |
| 10,535,003 B2 | 1/2020 | Parker, Jr. |
| 10,977,258 B1 | 4/2021 | Liu |
| 10,984,835 B2 | 4/2021 | Jarman |
| 11,175,735 B2 | 11/2021 | Gilra |
| 11,410,144 B1 | 8/2022 | Knas |
| 11,699,027 B1* | 7/2023 | Wu .................... G06F 40/56 |
| | | 715/254 |
| 2009/0300539 A1 | 12/2009 | Hendricks |
| 2009/0306959 A1* | 12/2009 | Rappoport .............. G09B 7/02 |
| | | 704/2 |
| 2011/0087955 A1 | 4/2011 | Ho |
| 2021/0096705 A1 | 4/2021 | Rosenberg |
| 2021/0173834 A1 | 6/2021 | Aravamudan |
| 2021/0248316 A1 | 8/2021 | Wroczynski |
| 2022/0414318 A1* | 12/2022 | Bhandarkar ......... G06F 18/214 |
| 2023/0042930 A1* | 2/2023 | Cohen .................. G06V 30/413 |
| 2023/0215527 A1* | 7/2023 | Caudill ............... G06F 3/04855 |
| | | 705/3 |

FOREIGN PATENT DOCUMENTS

| | | |
|---|---|---|
| KR | 102258424 B1 | 6/2021 |
| WO | 2013055632 A1 | 4/2013 |

OTHER PUBLICATIONS

IBM Cloud API Docs, "Natural Language Understanding," IBM [online], Aug. 16, 2022 [accessed on Jan. 27, 2023], 85 pages, Retrieved from the Internet: <URL: https://cloud.ibm.com/apidocs/natural-language-understanding#concepts>.

IBM Cloud, "Watson Natural Language Understanding," IBM [online], [accessed on Jan. 27, 2023], 4 pages, Retrieved from the Internet: <URL: https://www.ibm.com/cloud/watson-natural-language-understanding/details>.

* cited by examiner

NATURAL LANGUAGE PROCESSING ELECTRONIC PASSAGE CURATION

BACKGROUND

The present invention relates, generally, to the field of computing, and more particularly to natural language processing.

Natural language processing (NLP) is a field of computing concerned with giving computers the ability to understand text in much the same way humans can. Natural language processing can enable computers to process human language in text form and to understand its full meaning, comprising the writer's intent and sentiment. Currently, natural language processing can understand text in a book and classify the text into groupings. However, it is likely that a reader may not experience any benefit from just the classification of text alone while reading a book. Therefore, in order for natural language processing to provide a reader with a customizable experience, a method and system by which the content in sections of an electronic book is identified and highlighted/obscured, are needed. Thus, an improvement in natural language processing has the potential to benefit electronic book readers by curating the text of electronic books to the reader's preferences.

SUMMARY

According to one embodiment, a method, computer system, and computer program product for electronic text curation is provided. The present invention may include analyzing text of an electronic book and reader preferences; coordinating at least one preset value based on the analyzed text and the analyzed reader preferences; calculating one or more initial scores; annotating the text of the electronic book based on the analyzed text and the analyzed reader preferences; updating the one or more calculated initial scores through dynamic scoring implementation; calculating one or more final scores; and highlighting the text of the electronic book based on the one or more calculated final scores.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

While reading a book, a reader may identify the content of a section while reading through the section. Cases exist when a reader may choose to skip over sections of a book, for example when they come to passages of which they already have a high understanding or find a certain character's story uninteresting. However, a reader may wish to skip a section before they encounter the section or begin reading through it. In order for a truly customizable experience, a method to automatically identify the content in sections of an electronic book and highlight or obscure the text in the sections is needed. Therefore, a reader's experience may be hindered by a lack of a method in which an electronic book can be curated toward their preferences. As a result, readers are not provided with a truly customizable reading experience and may end up spending their time less efficiently because of having to read parts of a book that are of little to no interest or encountering sensitive material that has a negative effect on the reader.

One way in which current methods attempt to curate text in electronic books is by modifying passages of the book based on a reader profile to display different "versions" of the electronic book. Modifying the passages of a book allows for at least some curation of the text to a reader's preferences. However, one of the deficiencies of the current method is that the method relies only on reader-inputted information and does not comprise the ability to build the reader's profile with information gathered from the internet. Another deficiency of the current method is that the method is not dynamic, meaning the electronic books are only modified before reading has begun and are not updated as a reader progresses through the book, based on the reader's behavior. It is important that an electronic book can be curated to a reader's preferences as closely as possible, both before a reader begins reading the book and during the reading of the book. Thus, an improvement in natural language processing has to potential to benefit readers by providing each reader with a personal preference-based reading experience.

The present invention has the capacity to improve natural language processing by curating each passage in an electronic book for the reader of the book. The program can automatically identify the content in sections of an electronic book and can visually highlight or obscure certain text based on a reader's preferences. This improvement in natural language processing can be accomplished by implementing a system that analyzes the text of an electronic book and reader preferences, coordinates at least one preset value based on the analyzed text and the analyzed reader preferences, calculates one or more initial scores, annotates the text of the electronic book based on the analyzed text and the analyzed reader preferences, updates the one or more calculated initial scores through dynamic scoring implementation, calculates one or more final scores, and highlighting the text of the electronic book based on the one or more calculated final scores.

In some embodiments of the invention, the electronic text passage curation determination program, herein referred to as "the program", can analyze the text of an electronic book and a reader's preferences. A reader may comprise a person who is using the program. The program can analyze the text of any book available in an electronic reader format. The program can analyze the text of an electronic book to identify one or more concepts of a passage. A passage may comprise one or more paragraphs. A concept may comprise authors, genres, elements of the book, such as plot, setting, characters, point of view, themes, etc. that represent a passage, part of an electronic book, or the electronic book as a whole. Additionally, the program can analyze default concepts, such as publicly available data on books such as ISBNs and book categories, for example, thrillers or mysteries, and dictionaries to identify concepts in the electronic book. The program may analyze public media data such as movie scripts and other electronic books to create a custom dictionary for use in concept tagging.

The program can analyze a reader's preferences. The program can analyze a reader's preferences to determine annotations to make to text of the electronic book. Reader preferences may be stored within a reader's profile in the database. The reader profile may store reader preferences, reader inputted information, such as a reader's response(s) to quizzes, and custom concept tags, etc. Reader preferences may be general, such as the genres a reader likes or the character types that the reader dislikes, etc. Additionally, reader preferences may be specific, such as a specific type of scene that a reader wants to skip, specific words that the reader wants to be obscured, or an author that the reader likes, etc. The program may connect to a reader's social media platforms. The reader's profile may allow for integration of outside platforms, so that the program can analyze the reader's social media information in building the reader's profile. Outside platforms, for example, may be social networks that are not located within the program. The program can analyze the reader's social media data to determine the concepts a reader likes/dislikes, etc. Social media data may comprise likes, shares, GoodReads comments, star ratings, etc. The program can create an emotional valence score based on the analyzed reader's social media information. Specifically, the emotional valence score can be based on the reader's comments, reactions, ratings, etc. The emotional valence score may be used to annotate text of the electronic book.

Additionally, the program can generate a quiz, which is given to a reader upon the reader opening the program. The quiz may comprise questions that are used to determine topics, ideas, authors, genres, etc. which a reader likes/dislikes. The program can gather reader-defined filtering for various topics, such as violence, NSFW, etc., through quizzes.

The program can analyze the text of an electronic book and a reader's preferences using natural language processing. Natural language processing may be performed using artificial intelligence systems such as IBM Watson® Natural Language Understanding (IBM Watson® and all IBM Watson®-based trademarks and logos are trademarks or registered trademarks of International Business Machines Corporation, and/or its affiliates). Natural language processing can use deep learning to extract meaning and metadata data from unstructured text data. Natural language processing can use text analytics to extract categories, classifications, entities, keywords, sentiments, emotions, relations, syntax, etc.

The program can coordinate preset values. The program can coordinate preset values based on the analyzed reader preferences. The preset values may comprise either a "+" tag or a "−" tag. The program may coordinate preset values to each analyzed concept comprised within the electronic book. The program may coordinate a "+" tag to each concept that the program determines a reader likes. Conversely, the program may coordinate a "−" tag to each concept that the program determines a reader dislikes. Additionally, if a reader expressly lists a preference or a dislike for a concept in their reader preferences, the program may apply extra weight (+/−) on the respective preset concept tags.

The program can calculate the initial scores (U) of the concept tags. The program can calculate the initial score(s) of concept tags using the following formula:

$$\text{Initial Score}(U) = \left( \frac{\text{SUM}}{(+/- \text{Tags})} \right)$$

The program may use a scoring algorithm to determine values of concept tags. The program can input initially input reader-defined filtering and concept presets, reader social media data, book and dictionary data, public media data, etc. into the scoring algorithm. The values of the concept tags can be set into a u-vector scoring format. If the program detects positive interactions with a concept through the reader's social media accounts, the program may increase the value of an initial score. If the program detects no interaction with a concept through the reader's social media accounts, the program may leave the value of an initial score the same. If the program detects negative interactions with a concept through the reader's social media accounts, the program may decrease the value of an initial score. The initial scores may be weighted further based on a reader's reading history.

The program can learn concept tags based on the text of an electronic book and the reader's preferences. Concept tags can be automatically learned by analyzing the reader's social media or other custom content provided by the reader. Also, concept tags can be learned by comparing the current electronic book to previously read electronic books by the reader.

The program can annotate the text of the electronic book based on the analysis of the text in the electronic book and the reader's preferences. The program can annotate the concept names in the margins of the electronic book. Concept tags can identify the one or more concepts of a passage in the analyzed text, such as dogs, horror, antagonist, etc. The program can analyze a segment of text using natural language processing (NLP) by scanning the text for reader-defined tags. If a concept is not comprised within the reader-defined tags, the program may automatically tag visuals for the reader. The program can create concept tags from an emotional valence score, preset tags from the reader, automatic tags from previously read books, etc. The program can use NLP to create the concept tags. The program can automatically create the concept tags in the margins of the electronic book. In some embodiments of the invention, the program may highlight the text of the electronic book based on the reader's preferences. The initial highlighting of text may comprise obscuring text or highlighting text with one or more colors.

In some embodiments of the invention, the program may create a hierarchy of concepts. The program may create a hierarchy of concepts in identified passages comprising more than one concept. The program may tag both concepts in the margin. The concept tags may be searchable by a reader using the GUI. For an audiobook embodiment, the concept tags may be searchable via spoken word.

In some embodiments of the invention, specifically, in embodiments where the client device comprises a speaker, the program may read text aloud to a reader. In some embodiments of the invention, specifically, in embodiments where the client device comprises a microphone, the program may generate concept tags for text based on the reader's voice commands.

The program can update the initial scoring (u) through dynamic scoring implementation. The program can perform a dynamic analysis to generate a dynamic score (u'). A dynamic analysis comprises dynamically analyzing a reader's behavior through the reader's inputs and by tracking the eyes of the reader while the reader is reading. Analyzing a reader's behavior may comprise detecting the reader's inputs on the graphical user interface (GUI). Reader's inputs may comprise written reader-generated concept tags or highlighted text. The program can update the preset values or create a new preset value based on the analysis of the reader's behavior, for example by increasing/decreasing the weight. Additionally, the program can automatically create the reader-generated concept tags in the margins of the electronic book. Also, a reader may choose to remove concept tags using the GUI.

The program can track the eyes of a reader. The program can track the eyes of the reader using an internal camera. The program may use data gathered from the eye-tracking device to analyze a reader's reading behavior, such as how much time it takes for a reader to read a certain quantity of text or the movement of a reader's eyes when the reader is skipping a concept. The program may utilize eye tracking to dynamically determine when a reader is skipping over a section of text. If the program determines that a reader is skipping over a section of text, the program may initiate automatic tagging. Automatic tagging may comprise generating additional concept tags. Additionally, the program can use the eye-tracking data to gauge interest(s) of the reader and may generate or update the preset values based on the analysis of the reader's behavior, for example by increasing/decreasing their weight.

The program can update the initial scoring (U), known as the updated score (u), based on the performed dynamic analysis. The reader's behavior patterns, such as the real-time tagging, and the eye tracking data from the dynamic scoring analysis may be inputted into the scoring algorithm. The program can update the initial scoring (U) using the following formula:

$$\text{Updated Score}(u) = \text{Initial Score}(U) + \text{Dynamic Scoring}(u')$$

The program can calculate one or more final scores, otherwise referred to as a transparency score. The program can calculate the transparency score by inputting the updated score into a scoring algorithm, such as Softmax probabilistic algorithm. The Softmax score can comprise a value that determines how grayed out/transparent certain text will be when highlighted. The program can calculate the transparency score using the following formula:

$$\text{Softmax}(u) = \text{Transparency Score}$$

The final score may be dynamically updated as a reader progress through an electronic book based on the reader's behavior and the eye tracking of the reader's eyes.

The program can highlight text of the electronic book based on the calculated transparency score. The highlighting of text can be color-coded, for example, yellow for persons, green for places, etc. The highlighting of text can be in black, white, and various shades of gray, through grey-scale shading. Specifically, the program can highlight passages of text comprising certain concepts based on their respective Softmax(u) values. The higher the Softmax score can indicate the highlighted text will be more transparent and visible. The lower the Softmax score can indicate that the highlighted text will be more visible. The highlighting of text may be dynamically updated as a reader progress through an electronic book, based on changes in the final scores.

An exemplary use of the invention may involve Kate reading an electronic book. Kate arrives at a passage in the book which comprises <<"No-HEDWIG!" The broomstick spun to earth, but he just managed to seize the strap of his rucksack and the top of the cage as the motorbike swung the right way up again. A second's relief, and then another burst of green light. The owl screeched and fell to the bottom of the cage. "No-NO!" The motorbike zoomed forward; Henry glimpsed hooded Spooky Figures scattering as Henrik blasted through their circle. "Hedwig—Hedwig—". But the owl lay static and pathetic as a toy on the floor of her cage. He could not take it in, and his terror for the others was paramount.>> The program analyzes Kate's preferences and determines that Kate likes scenes comprising animals, dislikes scary scenes, and strongly dislikes terror. Therefore, based on the analysis of Kate's preferences, the program may highlight each use of "Hedwig" in yellow. Also, the program may highlight "The owl screeched and fell to the bottom of the cage." in gray. Additionally, the program may obscure "But the owl lay static and pathetic as a toy on the floor of her cage." in black.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to analyze the text of an electronic book and reader preferences, coordinate at least one preset value based on the analyzed text and the analyzed reader preferences, calculate one or more initial scores, annotate the text of the electronic book based on the analyzed text and the analyzed reader preferences, update the one or more calculated initial scores through dynamic scoring implementation, calculate one or more final scores, and highlighting the text of the electronic book based on the one or more calculated final scores.

Figure 1:
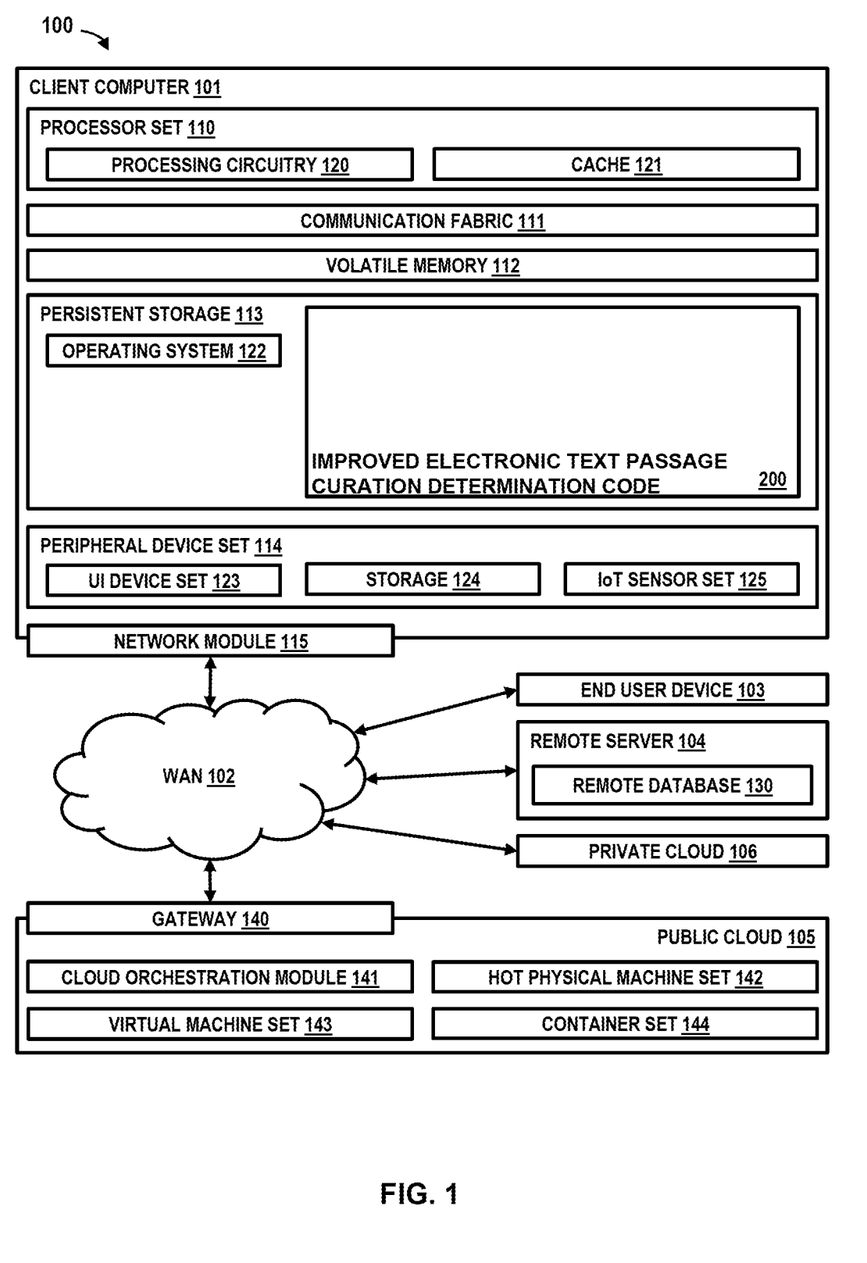
FIG. 1 illustrates an exemplary networked computer environment according to at least one embodiment.

Referring to FIG. 1, an exemplary networked computer environment 100 is depicted, according to at least one embodiment. Computing environment 100 contains an example of an environment for the execution of at least some of the computer code involved in performing the inventive methods, such as improved electronic text passage curation determination code 200. In addition to code block 200 computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
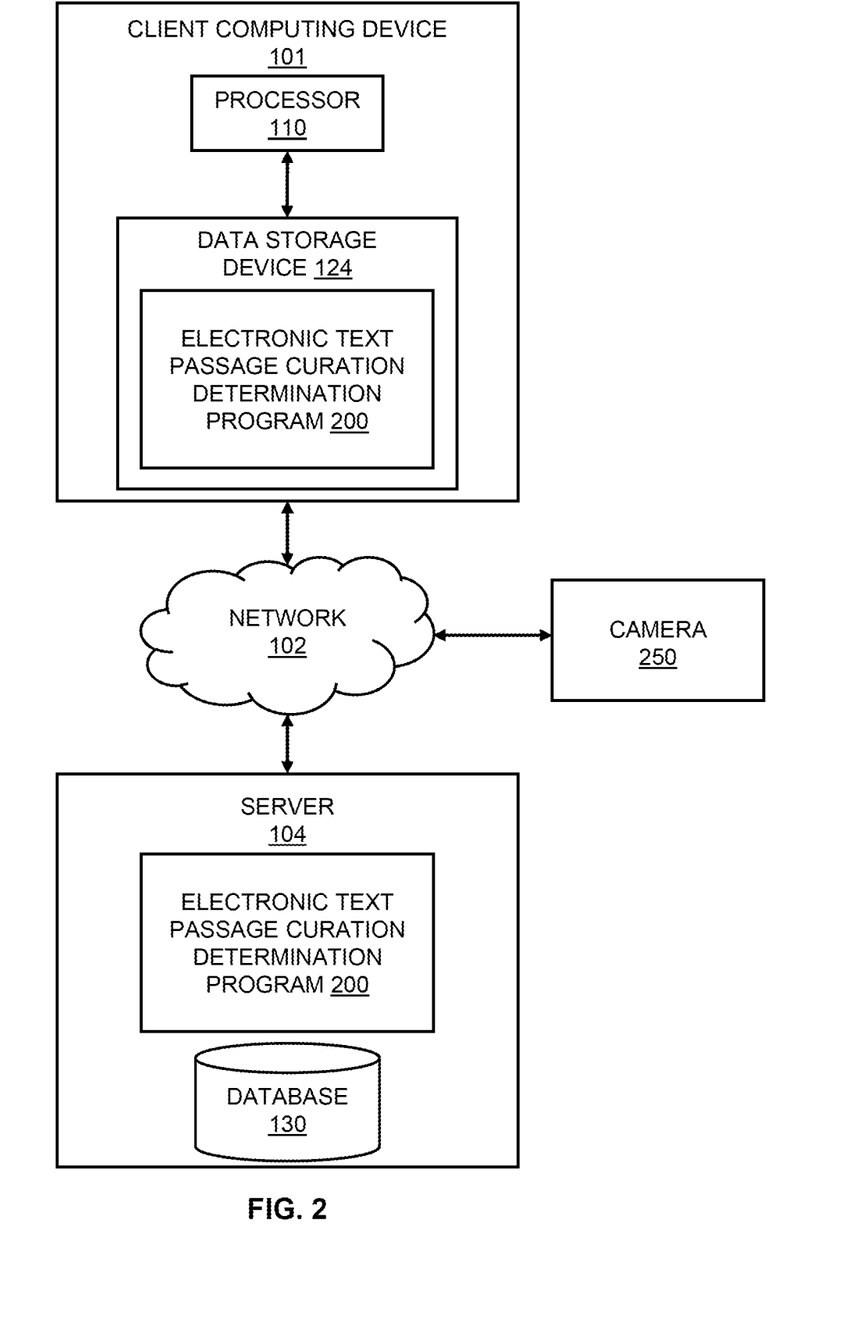
FIG. 2 illustrates an exemplary application invention environment according to at least one embodiment.

Referring to FIG. 2, an exemplary application environment is depicted, according to at least one embodiment. FIG. 2 may include client computing device 101 and a remote server 104 interconnected via a communication network 102. According to at least one implementation, FIG. 2 may include a plurality of client computing devices 101 and remote servers 104, of which only one of each is shown for illustrative brevity. It may be appreciated that FIG. 2 provides only an illustration of one implementation and does not imply any limitations with regard to the environments in which different embodiments may be implemented. Many modifications to the depicted environments may be made based on design and implementation requirements.

Client computing device 101 may include a processor 110 and a data storage device 124 that is enabled to host and run an electronic text passage curation determination program 200 and communicate with the remote server 104 via the communication network 102, in accordance with one embodiment of the invention.

The remote server computer 104 may be a laptop computer, netbook computer, personal computer (PC), a desktop computer, or any programmable electronic device or any network of programmable electronic devices capable of hosting and running an electronic text passage curation determination program 200 and a database 130 and communicating with the client computing device 101 via the communication network 102, in accordance with embodiments of the invention. The remote server 104 may also operate in a cloud computing service model, such as Software as a Service (SaaS), Platform as a Service (PaaS), or Infrastructure as a Service (IaaS). The remote server 104 may also be located in a cloud computing deployment model, such as a private cloud, community cloud, public cloud, or hybrid cloud.

The database 130 may be a digital repository capable of data storage and data retrieval. The database 130 can be present in the remote server 104 and/or any other location in the network 102. The database 130 can store reader preferences and data relating to the analyzed text of an electronic book. The database 130 may comprise an electronic book library. The electronic book library may comprise the original copy of an electronic book and the annotated/highlighted copy of the electronic book. The database 130 may comprise a reader's profile and the information comprised within the profile, such as a reader's preferences. The database 130 may comprise a reader's answers to quiz questions. The database 130 may comprise a reader's social media data from outside platforms. The database 130 can comprise a knowledge corpus. The knowledge corpus may be updated based on the camera 250 and the continuous tracking of readers' eyes. Also, the knowledge corpus may comprise information relating to object recognition.

A camera 250 may be any device capable of continuously tracking and capturing a reader's eyes while static or in movement. The camera 250 can comprise any device capable of recording visual images in the form of photographs, films, or video signals, such as a physical or virtual camera. The camera 250 may be embedded in the client computing device 101.

According to the present embodiment, text passage curation determination program 200 herein referred to as "the program", may be a program capable of analyzing the text of an electronic book and reader preferences, coordinating at least one preset value based on the analyzed text and the analyzed reader preferences, calculating one or more initial scores, annotating the text of the electronic book based on the analyzed text and the analyzed reader preferences, updating the one or more calculated initial scores through dynamic scoring implementation, calculating one or more final scores, and highlighting the text of the electronic book based on the one or more calculated final scores. The program 200 may be located on client computing device 101 or remote server 104 or on any other device located within network 102. Furthermore, the program 200 may be distributed in its operation over multiple devices, such as client computing device 101 and remote server 104. The electronic text passage curation determination method is explained in further detail below with respect to FIG. 3.

Figure 3:
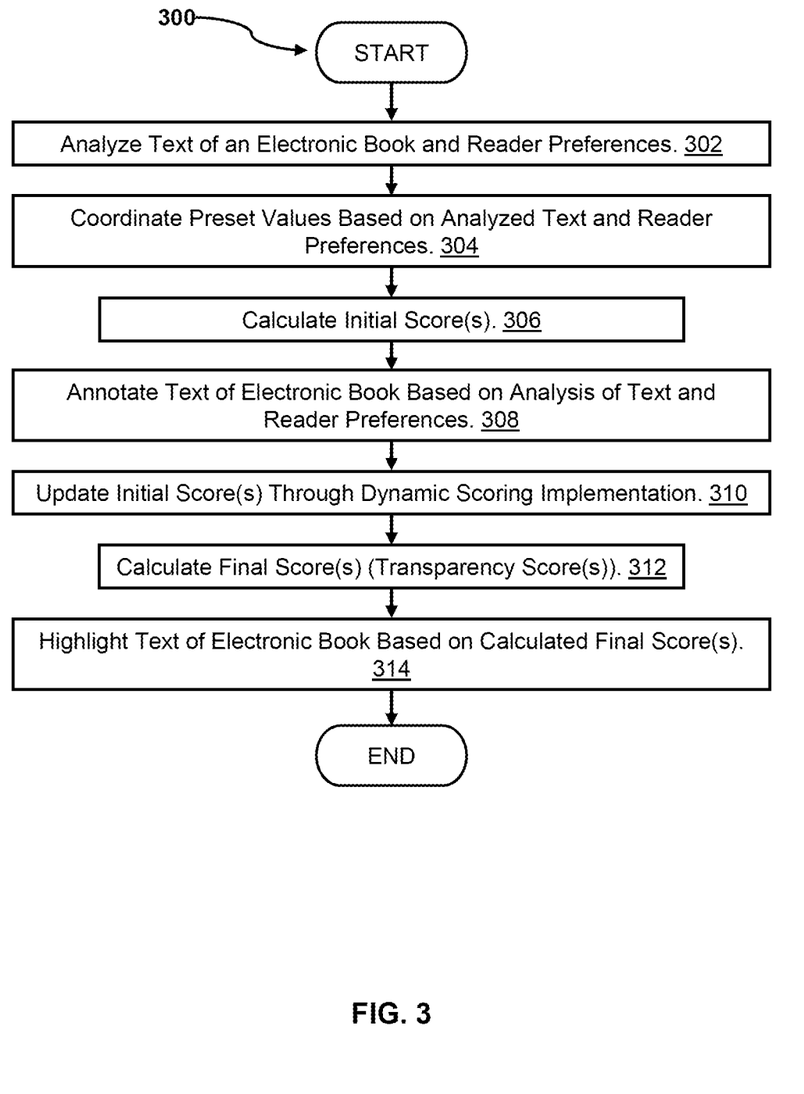
FIG. 3 is an operational flowchart illustrating an improved electronic text passage curation determination process according to at least one embodiment.

Referring now to FIG. 3, an operational flowchart illustrating an electronic text passage curation determination process 300 is depicted according to at least one embodiment. At 302, the program 200 analyzes the text of an electronic book and a reader's preferences. A reader may comprise a person who is using the program 200. The program 200 can analyze the text of any book available in an electronic reader format. The program 200 can analyze the text of an electronic book to identify one or more concepts of a passage. A passage may comprise one or more paragraphs. A concept may comprise authors, genres, elements of the book, such as plot, setting, characters, point of view, themes, etc. that represent a passage, part of an electronic book, or the electronic book as a whole. Additionally, the program 200 can analyze default concepts, such as publicly available data on books such as ISBNs and book categories, for example, thrillers or mysteries, and dictionaries to identify concepts in the electronic book. The program 200 may analyze public media data such as movie scripts and other electronic books to create a custom dictionary for use in concept tagging.

The program 200 can analyze a reader's preferences. The program 200 can analyze a reader's preferences to determine annotations to make to text of the electronic book. Reader preferences may be stored within a reader's profile in the database 130. The reader profile may store reader preferences, reader inputted information, such as a reader's response(s) to quizzes, and custom concept tags, etc. Reader preferences may be general, such as the genres a reader likes or the character types that the reader dislikes, etc. Additionally, reader preferences may be specific, such as a specific type of scene that a reader wants to skip, specific words that the reader wants to be obscured, or an author that the reader likes, etc. The program 200 may connect to a reader's social media platforms. The reader's profile may allow for integration of outside platforms, so that the program 200 can analyze the reader's social media information in building the reader's profile. Outside platforms, for example, may be social networks that are not located within the program 200. The program 200 can analyze the reader's social media data to determine the concepts a reader likes/dislikes, etc. Social media data may comprise likes, shares, GoodReads comments, star ratings, etc. The program 200 can create an emotional valence score based on the analyzed reader's social media information. Specifically, the emotional valence score can be based on the reader's comments, reactions, ratings, etc. The emotional valence score may be used to annotate text of the electronic book.

Additionally, the program 200 can generate a quiz, which is given to a reader upon the reader opening the program 200. The quiz may comprise questions that are used to determine topics, ideas, authors, genres, etc. which a reader likes/dislikes. For example, a quiz may comprise asking a reader what types of genres they prefer, how a reader feels about scenes in which a character is injured, etc. The program 200 can gather reader-defined filtering for various topics, such as violence, NSFW, etc., through quizzes.

The program 200 can analyze the text of an electronic book and a reader's preferences using natural language processing. Natural language processing may be performed using artificial intelligence systems such as IBM Watson® Natural Language Understanding (IBM Watson® and all IBM Watson®-based trademarks and logos are trademarks or registered trademarks of International Business Machines Corporation, and/or its affiliates). Natural language processing can use deep learning to extract meaning and metadata data from unstructured text data. Natural language processing can use text analytics to extract categories, classifications, entities, keywords, sentiments, emotions, relations, syntax, etc.

At 304, the program 200 coordinates preset values. The program 200 can coordinate preset values based on the analyzed reader preferences. The preset values may comprise either a "+" tag or a "−" tag. The program 200 may coordinate preset values to each analyzed concept comprised within the electronic book. The program 200 may coordinate a "+" tag to each concept that the program 200 determines a reader likes. Conversely, the program 200 may coordinate a "−" tag to each concept that the program 200 determines a reader dislikes. Additionally, if a reader expressly lists a preference or a dislike for a concept in their reader preferences, the program 200 may apply extra weight (+/−) on the respective preset concept tags.

At 306, the program 200 calculates the initial scores (U) of the concept tags. The program 200 can calculate the initial score(s) of concept tags using the following formula:

$$\text{Initial Score }(U) = \left(\frac{\text{SUM}}{(+/-\text{Tags})}\right)$$

The program 200 may use a scoring algorithm to determine values of concept tags. The program 200 can input initially input reader-defined filtering and concept presets, reader social media data, book and dictionary data, public media data, etc. into the scoring algorithm. The values of the concept tags can be set into a u-vector scoring format. If the program 200 detects positive interactions with a concept through the reader's social media accounts, the program may increase the value of an initial score. If the program 200 detects no interaction with a concept through the reader's social media accounts, the program may leave the value of an initial score the same. If the program 200 detects negative interactions with a concept through the reader's social media accounts, the program may decrease the value of an initial score. An example of initial scores may comprise the concepts [violence, dogs, cats, . . . ], comprising values of [−10, 50, 2, . . . ]. The initial scores may be weighted further based on a reader's reading history. For example, if a reader has read ten books, the scores may be based on an average of scores from the previous ten books.

The program 200 can learn concept tags based on the text of an electronic book and the reader's preferences. Concept tags can be automatically learned by analyzing the reader's social media or other custom content provided by the reader. Also, concept tags can be learned by comparing the current electronic book to previously read electronic books by the reader. For example, if a reader's reading data shows that they dislike certain types of electronic books, and the current electronic book contains some of the same concepts the reader has previously disliked, the program 200 can capture that information for scoring the concept tags.

At 308, the program 200 annotates the text of the electronic book based on the analysis of the text in the electronic book and the reader preferences. The program 200 can annotate the concept names in the margins of the electronic book. Concept tags can identify the one or more concepts of a passage in the analyzed text, such as dogs, horror, antagonist, etc. The program 200 can analyze a segment of text using natural language processing (NLP) by scanning the text for reader-defined tags. If a concept is not comprised within the reader-defined tags, the program 200 may automatically tag visuals for the reader. The program 200 can create concept tags from an emotional valence score, preset tags from the reader, automatic tags from previously read books, etc. The program 200 can use NLP to create the concept tags. The program 200 can automatically create the concept tags in the margins of the electronic book. In some embodiments of the invention, the program 200 may highlight the text of the electronic book based on the reader's preferences. The initial highlighting of text may comprise obscuring text or highlighting text with one or more colors.

In some embodiments of the invention, the program 200 may create a hierarchy of concepts. The program 200 may create a hierarchy of concepts in identified passages comprising more than one concept. For example, a passage may be describing nuclear physics but more specifically, be discussing gamma radiation. The program 200 may tag both concepts in the margin. The concept tags may be searchable by a reader using the GUI. For an audiobook embodiment, the concept tags may be searchable via spoken word.

In some embodiments of the invention, specifically, in embodiments where the client device 101 comprises a speaker, the program 200 may read text aloud to a reader. For example, a voice may announce an upcoming set of paragraphs that would be about a particular concept.

In some embodiments of the invention, specifically, in embodiments where the client device 101 comprises a microphone, the program 200 may generate concept tags for text based on the reader's voice commands. For example, a reader could state "tag the paragraphs on the current page as fiction."

At 310, the program 200 updates the initial scoring (u) through dynamic scoring implementation. The program 200 can perform a dynamic analysis to generate a dynamic score (u'). A dynamic analysis comprises dynamically analyzing a reader's behavior through the reader's inputs and by tracking the eyes of the reader while the reader is reading. Analyzing a reader's behavior may comprise detecting the reader's inputs on the graphical user interface (GUI). Reader's inputs may comprise written reader-generated concept tags or highlighted text. For example, while reading, a reader may come across a passage that they dislike and highlight the text with a note stating that the reader does not want to see text relating to the concept in the future. The program 200 can update the preset values or create a new preset value based on the analysis of the reader's behavior, for example by increasing/decreasing the weight. Additionally, the program 200 can automatically create the reader-generated concept tags in the margins of the electronic book. Also, a reader may choose to remove concept tags using the GUI.

The program 200 can track the eyes of a reader. The program 200 can track the eyes of the reader using an internal camera 250. The program 200 may use data gathered from the eye-tracking device to analyze a reader's reading behavior, such as how much time it takes for a reader to read a certain quantity of text or the movement of a reader's eyes when the reader is skipping a concept. The program 200 may utilize eye tracking to dynamically determine when a reader is skipping over a section of text. If the program 200 determines that a reader is skipping over a section of text, the program 200 may initiate automatic tagging. Automatic tagging may comprise generating additional concept tags. Additionally, the program 200 can use the eye-tracking data to gauge interest(s) of the reader and may generate or update the preset values based on the analysis of the reader's behavior, for example by increasing/decreasing their weight. For example, if the program 200 determines that the reader is skipping passages comprising sharks, the program 200 may generate a new preset value for "sharks" with a negative association or update the preset value of "sharks" with a heavier weighted association.

The program 200 can update the initial scoring (U), known as the updated score (u), based on the performed dynamic analysis. The reader's behavior patterns, such as the real-time tagging, and the eye tracking data from the dynamic scoring analysis may be inputted into the scoring algorithm. The program 200 can update the initial scoring (U) using the following formula:

$$\text{Updated Score}(u) = \text{Initial Score}(U) + \text{Dynamic Scoring}(u')$$

At 312, the program 200 calculates one or more final scores, otherwise referred to as a transparency score. The program 200 can calculate the transparency score by inputting the updated score into a scoring algorithm, such as Softmax probabilistic algorithm. The Softmax score can comprise a value that determines how grayed out/transparent certain text will be when highlighted. The program 200 can calculate the transparency score using the following formula:

$$\text{Softmax}(u) = \text{Transparency Score}$$

For example, u may comprise concepts such as <violence, dogs, cats>. The program 200 may determine initial scoring of <−10, 50, 2> respectively. The program 200 may input the updated scoring into Softmax(u) and u'(c) values of <0, 1, 0.3>. The final score may be dynamically updated as a reader progress through an electronic book based on the reader's behavior and the eye tracking of the reader's eyes.

At 314, the program 200 highlights text of the electronic book based on the calculated transparency score. The highlighting of text can be color-coded, for example, yellow for persons, green for places, etc. The highlighting of text can be in black, white, and various shades of gray, through greyscale shading. Specifically, the program 200 can highlight passages of text comprising certain concepts based on their respective Softmax(u) values. The higher the Softmax score can indicate the highlighted text will be more transparent and visible. The lower the Softmax score can indicate that the highlighted text will be more visible. For example, a score of 0.0 may comprise a grayed-out box with nonvisible text, a score of 0.5 may comprise a semi-grayed-out box but with visible text, and a score of 1.0 may comprise a transparent box. Continuing with the example above, the program 200 may determine that passages of text comprising violence are to be completely grayed out and not transparent to the reader, based on the Softmax value of 0.0. Additionally, the program 200 may determine that passages of text comprising dogs are to be completely transparent, based on the Softmax value of 1.0. Also, the program 200 may determine that passages of text comprising cats are to be shaded yellow but still transparent, based on the Softmax value of 0.3. The highlighting of text may be dynamically updated as a reader progress through an electronic book, based on changes in the final scores.

Figure 4:
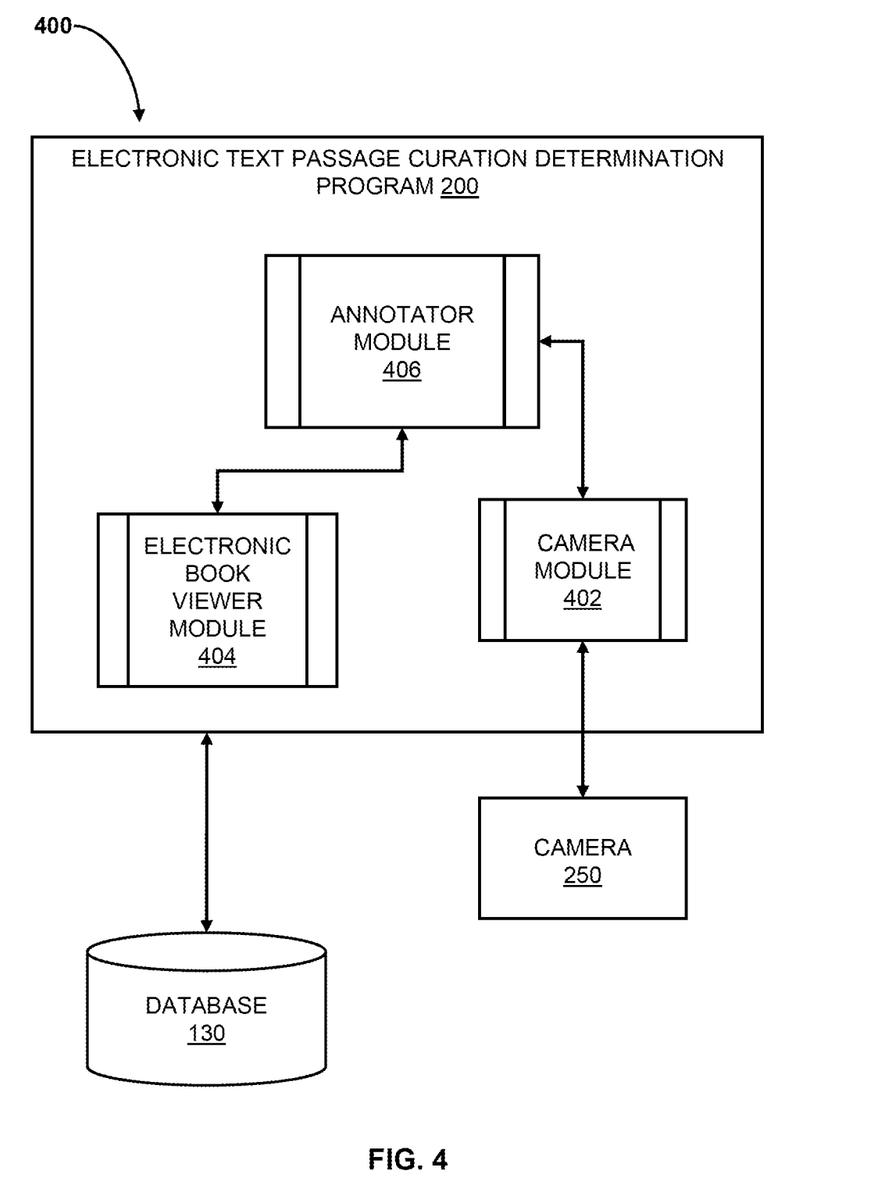
FIG. 4 is a system diagram illustrating an exemplary program environment of an implementation of an electronic text passage curation determination process according to at least one embodiment.

Referring now to FIG. 4, a system diagram illustrating an exemplary program environment 400 of an implementation of an electronic text passage curation determination process 300 is depicted according to at least one embodiment. Here, the program 200 comprises a camera module 402, an electronic book viewer module 404, and an annotator module 406. The exemplary program environment 400 details the interactions between the IoT module 402 and the annotator module 406, and the electronic book viewer module 404 and the annotator module 406. Additionally, the exemplary program environment 400 details the interactions between the electronic text passage curation determination program 200 and the database 130, and the camera module 402 and the internal camera 250.

The camera module 402 may be used to communicate with the camera 250. The electronic book viewer module 404 may be used to render the electronic book and modified/annotated text in the electronic book. The annotator module 406 may be used to annotate/highlight the text of an electronic book.

It may be appreciated that FIGS. 2 through 4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for separately curating an electronic book for each reader, the method comprising:

analyzing one or more passages within the electronic book to identify one or more concepts within each of the analyzed one or more passages, and a reader's preferences to determine one or more annotations to make within the electronic book;

coordinating preset values to each of the identified one or more concepts based on the determined one or more annotations to make within the electronic book;

inputting each of the coordinated preset values into a scoring algorithm to calculate one or more initial scores;

annotating at least one of the analyzed one or more passages within the electronic book pursuant to the calculated one or more initial scores;
upon detecting that the reader has begun reading the electronic book, analyzing, continuously, a reader's reading behavior;
updating at least one of the one or more calculated initial scores based on the analyzed reader's reading behavior;
inputting the updated calculated initial scores into a Softmax probabilistic algorithm to calculate one or more final scores, wherein each of the one or more calculated final scores comprise a value representing how grayed out, color-coded, or transparent corresponding text will be; and
highlighting the corresponding text within the electronic book for the reader pursuant to the one or more calculated final scores.

2. The method of claim 1, wherein the highlighting of the corresponding text within the electronic book further comprises obscuring at least a portion of the corresponding text.

3. The method of claim 1, wherein the reader's reading behavior comprises how much time it takes for the reader to read certain quantities of text and movements of a reader's eyes while reading.

4. The method of claim 1, wherein analyzing, continuously, the reader's reading behavior comprises gathering data from an eye-tracking device and from reader inputs, and inputting the gathered data into the scoring algorithm to generate one or more dynamic scores.

5. The method of claim 1, further comprising:
automatically updating the one or more calculated final scores as the reader progresses through the electronic book; and
upon detecting that one or more of the one or more finals scores have been updated, automatically highlighting corresponding text of the electronic book for the reader pursuant to the one or more updated final scores.

6. A computer system for separately curating an electronic book for each reader, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
analyzing one or more passages within the electronic book to identify one or more concepts within each of the analyzed one or more passages, and a reader's preferences to determine one or more annotations to make within the electronic book;
coordinating preset values to each of the identified one or more concepts based on the determined one or more annotations to make within the electronic book;
inputting each of the coordinated preset values into a scoring algorithm to calculate one or more initial scores;
annotating at least one of the analyzed one or more passages within the electronic book pursuant to the calculated one or more initial scores;
upon detecting that the reader has begun reading the electronic book, analyzing, continuously, a reader's reading behavior;
updating at least one of the one or more calculated initial scores based on the analyzed reader's reading behavior;
inputting the updated calculated initial scores into a Softmax probabilistic algorithm to calculate one or more final scores, wherein each of the one or more calculated final scores comprise a value representing how grayed out, color-coded, or transparent corresponding text will be; and
highlighting the corresponding text within the electronic book for the reader pursuant to the one or more calculated final scores.

7. The computer system of claim 6, wherein the highlighting of the corresponding text within the electronic book further comprises obscuring at least a portion of the corresponding text.

8. The computer system of claim 6, wherein the reader's reading behavior comprises how much time it takes for the reader to read certain quantities of text and movements of a reader's eyes while reading.

9. The computer system of claim 6, wherein analyzing, continuously, the reader's reading behavior comprises gathering data from an eye-tracking device and from reader inputs, and inputting the gathered data into the scoring algorithm to generate one or more dynamic scores.

10. The computer system of claim 6, further comprising:
automatically updating the one or more calculated final scores as the reader progresses through the electronic book; and
upon detecting that one or more of the one or more finals scores have been updated, automatically highlighting corresponding text of the electronic book for the reader pursuant to the one or more updated final scores.

11. A computer program product for separately curating an electronic book for each reader, the computer program product comprising:
one or more computer-readable tangible storage medium and program instructions stored on at least one of the one or more tangible storage medium, the program instructions executable by a processor to cause the processor to perform a method comprising:
analyzing one or more passages within the electronic book to identify one or more concepts within each of the analyzed one or more passages, and a reader's preferences to determine one or more annotations to make within the electronic book;
coordinating preset values to each of the identified one or more concepts based on the determined one or more annotations to make within the electronic book;
inputting each of the coordinated preset values into a scoring algorithm to calculate one or more initial scores;
annotating at least one of the analyzed one or more passages within the electronic book pursuant to the calculated one or more initial scores;
upon detecting that the reader has begun reading the electronic book, analyzing, continuously, a reader's reading behavior;
updating at least one of the one or more calculated initial scores based on the analyzed reader's reading behavior;
inputting the updated calculated initial scores into a Softmax probabilistic algorithm to calculate one or more final scores, wherein each of the one or more calculated final scores comprise a value representing how grayed out, color-coded, or transparent corresponding text will be; and
highlighting the corresponding text within the electronic book for the reader pursuant to the one or more calculated final scores.

12. The computer program product of claim 11, wherein the highlighting of the corresponding text within the electronic book further comprises obscuring at least a portion of the corresponding text.

13. The computer program product of claim 11, wherein the reader's reading behavior comprises how much time it takes for the reader to read certain quantities of text and movements of a reader's eyes while reading.

14. The computer program product of claim 11, wherein analyzing, continuously, the reader's reading behavior comprises gathering data from an eye-tracking device and from reader inputs, and inputting the gathered data into the scoring algorithm to generate one or more dynamic scores.

15. The method of claim 1, further comprising:
upon detecting that the reader is skipping one or more of the identified concepts while reading the electronic book, generating one or more concept tags using automatic tagging.

16. The computer system of claim 6, further comprising:
upon detecting that the reader is skipping one or more of the identified concepts while reading the electronic book, generating one or more concept tags using automatic tagging.

17. The computer program product of claim 11, further comprising:
upon detecting that the reader is skipping one or more of the identified concepts while reading the electronic book, generating one or more concept tags using automatic tagging.

18. The computer program product of claim 11, further comprising:
automatically updating the one or more calculated final scores as the reader progresses through the electronic book; and
upon detecting that one or more of the one or more finals scores have been updated, automatically highlighting corresponding text of the electronic book for the reader pursuant to the one or more updated final scores.

* * * * *